US008611185B2

(12) United States Patent
Mulargia

(10) Patent No.: US 8,611,185 B2
(45) Date of Patent: Dec. 17, 2013

(54) ANTENNA FOR SEISMIC SURVEY WITH UNIFORM SPATIAL SAMPLING IN WAVELENGTH

(76) Inventor: Francesco Mulargia, Bologna (IT)

( * ) Notice: Subject to any disclaimer, the term of this patent is extended or adjusted under 35 U.S.C. 154(b) by 436 days.

(21) Appl. No.: 13/031,731

(22) Filed: Feb. 22, 2011

(65) Prior Publication Data

US 2011/0273960 A1 Nov. 10, 2011

(30) Foreign Application Priority Data

May 7, 2010 (IT) .............................. BO2010A0290

(51) Int. Cl.
*G01V 1/00* (2006.01)
(52) U.S. Cl.
USPC ................................ 367/58; 367/40; 118/112
(58) Field of Classification Search
USPC ....................................... 367/40, 58; 181/112
See application file for complete search history.

(56) References Cited

U.S. PATENT DOCUMENTS

| 7,123,548 | B1 * | 10/2006 | Uzes .............................. 367/135 |
| 2002/0100327 | A1 * | 8/2002 | Kersey et al. ................... 73/597 |
| 2003/0225524 | A1 * | 12/2003 | Iranpour ......................... 702/14 |
| 2006/0034153 | A1 * | 2/2006 | Meunier et al. ................. 367/57 |
| 2010/0036614 | A1 * | 2/2010 | Zuercher ........................ 702/16 |

* cited by examiner

*Primary Examiner* — Isam Alsomiri
*Assistant Examiner* — Hovhannes Baghdasaryan
(74) *Attorney, Agent, or Firm* — David A. Guerra

(57) ABSTRACT

The present invention concerns a method and an antenna for active and/or passive seismic survey, such as a particular geometric layout of a plurality of vibration sensors, each one of adequate sensitivity, to be used with signal correlation in seismic surveys with or without an artificial wave source. In particular, the invention concerns a specific geometric layout of four vibration sensors, set along an alignment at positions, with one position chosen so that the antenna covers the desired wavelength interval. The sum of the signal correlations of all possible sensor couples allows a uniform sampling of all the spatial wavelengths that such an antenna defines, producing an accurate measure of the elastic and anelastic parameters of the subsoil and of the vibrational modes of a construction with the minimum possible number of sensors and minimum physical dimensions.

16 Claims, 2 Drawing Sheets

ANTENNA FOR SEISMIC SURVEY WITH UNIFORM SPATIAL SAMPLING IN WAVELENGTH

CROSS-REFERENCE TO RELATED APPLICATION

The present application claims priority under 35 U.S.C. 119(a) to Italy (IT) patent application number BO2010A000290 filed May 7, 2010, which IT patent application is incorporated herein by reference in its entirety.

BACKGROUND OF THE INVENTION

1. Field of the Invention

The present invention relates to an antenna for seismic survey that is to a particular geometric arrangement of a plurality of vibration sensors each with appropriate sensitivity and to be used in signal correlation. The present invention antenna, for its particular geometrical arrangement, realizes a uniform spatial sampling in wavelength, thus allowing an optimal reconstruction of the waveform of the seismic vibrational signal.

In particular, the invention is directed to a specific pattern of geometrical arrangement of four vibration sensors which, used in simultaneous signal correlation between all pairs of sensors, realizes a seismic antenna achieving the highest possible efficiency in measuring the elastic and anelastic properties of the subsoil or of a construction, minimizing costs and maximizing operational capability.

2. Description of the Prior Art

The measure of the elastic parameters of the subsoil has numerous applications, including the mapping of the subsurface without drilling, the assessment of soil stability and thus the risk of failure or permanent deformation of a building structure in the long term: the latter may also be related to consolidation works of the soil beneath the existing foundation, or to the design of earthquake resistant structures as required by the soil classification schemes NEHRP (USA), Eurocode 8 (Europe) and NTC2008 (Italy), which are essentially based on the S wave velocity of a homogeneous layer equivalent to the first 30 meters of subsoil, a parameter called Vs30.

Another field of application of the measure of the elastic and anelastic parameters relates not to the soil but to engineering structures. In modern civil and mechanical engineering, the dynamic modal analysis of a structure is a fundamental tool to determine its response to transient loads. Experimentally, the dynamic modal analysis is effected through a seismic survey aimed at measuring the vibrational modes of the structure, i.e. the frequencies at which the structure mechanically resonates. This provides a measure of the elastic parameters of the structure. The anelastic parameters can be measured from the decay of the elastic ones with time after a transient.

To measure the elastic and anelastic parameters it is convenient to use indirect techniques based on measurements at the surface. Typically, indirect techniques consist of a seismic survey, either based on the analysis of the seismic vibration produced by an artificial source, or of the weak seismic noise waves which are always present everywhere due to meteoric and/or industrial activities.

More specifically, the motion sensors used by the seismic techniques are electro-mechanical vibration transducers, preferably with vibration frequency between 2 and 30 Hz, commonly known as geophones.

Conventional seismic surveys relate to the measure of the velocity of elastic P and S body waves, which allows a depth of exploration in direct relation with the ratio of the velocity of the surface layer with the layers beneath it. Since the values of this ratio are generally between 2 and 4, the depth of investigation with the traditional methods of seismic survey is limited to ½~¼ the total length of the deployment of geophones.

Consequently, since the interest concerns at least the first 10 meters of subsoil, and more often the first 30 meters, deployments longer than at least 25, and more often longer than 100 meters, are required, with a consequently large number of geophones. The latter number is typically 16, but more often 24 (see FIG. 1) or 32, in order to overcome the difficulties of "picking" the first wave pulses. Such an experimental procedure is obviously expensive, with time-consuming setups and long operation times. In addition, it requires wide open spaces often unavailable in urban areas.

Classic seismic surveys make always use of artificial sources of waves and are based on the simple analysis of the first pulse of P and S seismic body waves, implying the use of only an infinitesimal part of the recorded signal. The situation is illustrated in FIG. 1, which shows how the classic seismic survey considers only the timing of the first pulse $1a, 1b, \ldots, 1z$ at the various geophones to infer the alignment 2, de facto "wasting" nearly all the information contained in the recordings.

Much more effective seismic methods have been recently developed. These are based on the analysis of Rayleigh and Love elastic surface waves, which are generated by the interference of P and S waves that is induced by the combined presence of a surface and of a stratification. Such wave guide surface waves are responsible for the near surface "resonance" of the medium and constitute in practice most of a seismic recording when the sensors are placed on or near the surface.

The analysis of wave guide waves is always a non trivial operation which requires appropriate and highly complex computer codes. But is also very powerful and allows to accurately determine the profile of the P and S body wave velocities in the medium.

Such techniques of analysis for surface waves (see, for example, GB Park et al. In "Multi-channel analysis of surface waves—MASW" published in Geophysics, vol. 64, p. 800-808. 1999), use thoroughly the information contained in the seismic recordings and allow to explore the medium much more accurately and down to greater depths than the classic ones, at the same time reducing the required lengths of sensor deployments.

For surface waves is in fact valid a relationship between the wavelength and the thickness of the layer explored, so that a measure of the velocity at different frequencies allows to determine the elastic properties of the subsurface as a function of depth. In general, the components with a long wavelength L explore the medium down to greater depths, while the components with a shorter wavelength explore a shallower portion near the surface.

In "active" seismic surveys, the energizing is carried out by means of an artificial source of waves, typically a small detonation. In this way, wave fronts are generated at the surface and propagate into the subsoil.

"Passive" seismic surveys, instead, rely on the waves of seismic noise, which consists mainly of surface waves. Since noise waves have a smaller amplitude than those used in active exploration, more sensitive instruments are required.

An active—passive option exists identically also in seismic surveys aimed at the dynamic modal analysis of constructions. Namely, in the active modal analysis the structures are set into predetermined motion by hydraulic jacks, vibrators or mass impacts, while in the passive modal analysis the excitation is provided by independently existent external causes, such as seismic noise, wind, traffic, etc.

Traditionally, seismic active surveys use (see FIG. 1) in-line equally spaced deployments of geophones $3a$, $3b, \ldots, 3z, \ldots$ commonly known as "arrays", from which the wave source 4 is positioned at some distance. The wave velocity is directly measured by the time-distance curve 2 of the first pulses recorded at the various geophones. An in-line constant spaced array of geophones is thus well suited to this type of elementary analysis.

While the above-described devices fulfill their respective, particular objectives and requirements, the aforementioned patents do not describe an antenna for seismic survey with uniform spatial sampling in wavelength that allows active and/or passive seismic survey.

Therefore, a need exists for a new and improved antenna for seismic survey with uniform spatial sampling in wavelength that can be used for active and/or passive seismic survey. In this regard, the present invention substantially fulfills this need. In this respect, the antenna for seismic survey with uniform spatial sampling in wavelength according to the present invention substantially departs from the conventional concepts and designs of the prior art, and in doing so provides an apparatus primarily developed for the purpose of active and/or passive seismic survey.

SUMMARY OF THE INVENTION

In view of the foregoing disadvantages inherent in the known types of seismic surveys now present in the prior art, the present invention provides an improved antenna for seismic survey with uniform spatial sampling in wavelength, and overcomes the above-mentioned disadvantages and drawbacks of the prior art. As such, the general purpose of the present invention, which will be described subsequently in greater detail, is to provide a new and improved antenna for seismic survey with uniform spatial sampling in wavelength and method which has all the advantages of the prior art mentioned heretofore and many novel features that result in an antenna for seismic survey with uniform spatial sampling in wavelength which is not anticipated, rendered obvious, suggested, or even implied by the prior art, either alone or in any combination thereof.

To attain this, the present invention essentially comprises a plurality of vibration sensors each one having a sensitivity to be used simultaneously in sum of correlation for at least one seismic survey. The vibration sensors have a particular geometric layout that realizes uniform sampling in spatial wavelength.

The vibration sensors are at least 4 vibration sensors positioned along an alignment at distances $d0=0$, $d=1d$, $d=4d$, $d=6d$ starting from an origin. Distance d is a value of distance to explore a desired wavelength interval, which results comprised between 2d and 24d.

There has thus been outlined, rather broadly, the more important features of the invention in order that the detailed description thereof that follows may be better understood and in order that the present contribution to the art may be better appreciated.

The invention may also include a cable connecting adjacent vibration sensors. The length of the cable between consecutive couples is fixed to prescribed values, in order to allow an immediate deployment without the need of any further measurement nor device.

There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved antenna for seismic survey with uniform spatial sampling in wavelength that has all of the advantages of the prior art seismic surveys and none of the disadvantages.

It is another object of the present invention to provide a new and improved antenna for seismic survey with uniform spatial sampling in wavelength that may be easily and efficiently manufactured and marketed.

An even further object of the present invention is to provide a new and improved antenna for seismic survey with uniform spatial sampling in wavelength that has a low cost of manufacture with regard to both materials and labor, and which accordingly is then susceptible of low prices of sale to the consuming public, thereby making such antenna for seismic survey with uniform spatial sampling in wavelength economically available to the buying public.

Still another object of the present invention is to provide a new antenna for seismic survey with uniform spatial sampling in wavelength that provides in the apparatuses and methods of the prior art some of the advantages thereof, while simultaneously overcoming some of the disadvantages normally associated therewith.

Even still another object of the present invention is to provide an antenna for seismic survey with uniform spatial sampling in wavelength for active and/or passive seismic survey. This allows for a uniform spatial sampling in wavelength.

Lastly, it is an object of the present invention to provide a new and improved method of conducting seismic survey with uniform spatial sampling in wavelength using a plurality of vibration sensors each one having a sensitivity to be used simultaneously in sum of correlation for at least one seismic survey. The vibration sensors are positioned in a predetermined geometric layout that realizes uniform sampling in spatial wavelength. Motion is measured using the vibration sensors, and the signals simultaneously correlated.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
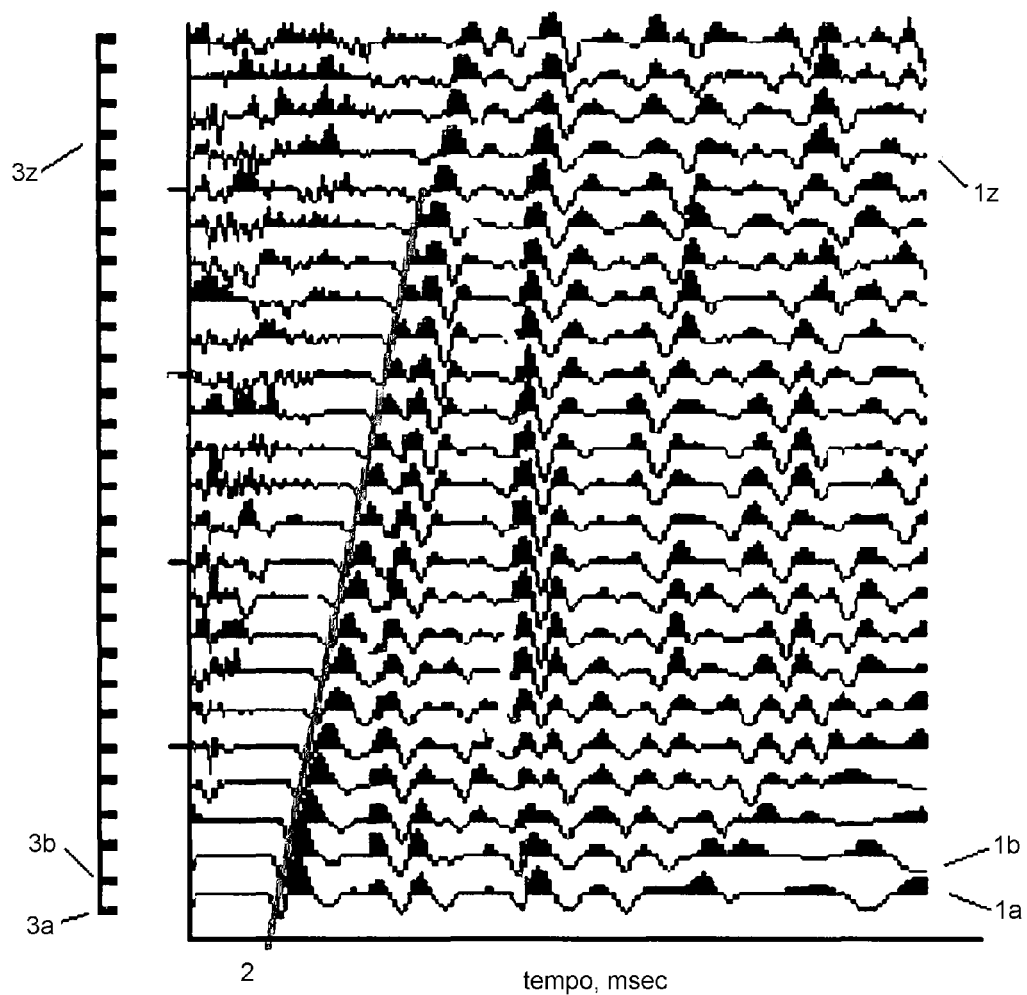
FIG. 1 is a graphical representation of the prior art use of only an infinitesimal part of the recorded signal.
Figure 1:

With reference to the drawings a preferred embodiment of the present invention is shown, and wherein the inventor has realized that, although ubiquitously used also to record analyse surface waves and in modal analysis, such arrays are highly ineffective in extracting information from the waveforms.

In fact, from the mathematical point of view, the problem is to fit an appropriate mathematical function to each recorded signal. Since each recording describes the passage of a complex wave, it has a large number of zeros and representing it with polynomial functions is unthinkable. The reason is that since the number of zeros of a polynomial function is equal to its degree, and the number of coefficients of the polynomial is equal to its degree +1, this would require the use of polynomials of extremely high degree with a corresponding extremely large number of coefficients, which would make the problem practically intractable.

Conversely, the problem is conveniently solved by transforming the signal through the Fourier transform into a sum of oscillating sine and cosine functions, each of which has inherently two zeros per cycle, so that the number of zeros is not tied to the number of parameters, but to the duration of the signal.

Since each oscillating function is identified by three parameters—amplitude, wavelength and initial phase—the Fourier transformation allows to describe a complex function as a wave with a small number of parameters by splitting the signal into its components at different wavelengths.

The following relation holds:

$$VL = f \qquad \text{Equation (1)}$$

where V is the wave velocity and f is the frequency. Hence, in a medium with wave velocity V, to each frequency f corresponds a wavelength L, so that the descriptions in either terms are equivalent.

As with all modern measuring devices, each geophone is actually composed of an analog motion sensor, typically electrodynamic, and of an electronic digitizer, which samples the signal continuously in time at a predetermined frequency, and translates it into a discrete set of numerical values which represent the signal amplitude at different time instants. This translation is necessary for the signals to be processed in a digital computer.

For the Nyqvist theorem, a signal sampled at frequency fc for a time iso interval T0 seconds long gives a correct picture of the original signal in the frequency range f0=1/T0 to fmax=2fc. In order to properly sample an elementary oscillating sine or cosine function with frequency f, it is therefore necessary that f falls within this range f0<f<fc, and that, at the same time, f is also in the frequency range in which the instrumental response of the geophone is appropriate.

Now, if the sampling time for the digitization of the signal is an inevitable step for its processing regardless of the number of sensors used, it should be noted that an array of geophones performs at each instant also a simultaneous sampling of the wave at spatially discrete points. This gives the possibility of optimally combining the information captured by each sensor at the same instant to efficiently reconstruct the shape of the wave. Such a procedure is commonly used in radio astronomy, where the best use of all information is vital to identify very distant—and thus very small and faint—objects, but has so far been only marginally exploited in seismology and never adequately applied to seismic surveying.

The theorem on which it is based the analysis of an oscillating signal continuously sampled simultaneously at spatially discrete points, is that of Wiener-Khinchine. This states that the power P of the signal simultaneously detected by the set of sensors that form an antenna is equal to the sum of the cross-correlations between all possible sensor pairs $$P = \Sigma r \Sigma s b^2 Crs \qquad \text{Equation (2)}$$

where b is the sensitivity of each sensor and Crs is the cross-correlation between the signal recorded at the r-th and s-th sensors.

In particular, it is possible to write the power P as $$P(k) = \Sigma r \Sigma s b^2 g(k) \qquad \text{Equation (3)}$$

where g(k) is the antenna gain at the wave number k, i.e. at the wave length L=2π/k. By virtue of (3) and (4) the power spectrum of the signal can be immediately written in terms of the spectral gain function $$g(k) = \Sigma r \Sigma s \cos 2\pi k(xr - xs) \qquad \text{Equation (4)}$$

where xr and xs are respectively the position vectors of the geophones r and s. The power P is only dependent upon the distances between the couples of sensors and not upon their absolute position.

Each component of the wave at a given frequency (i.e. at wave number k) has a periodic maximum or minimum at ¼ of the wavelength. This means that by measuring the wave amplitude at the spatial points covering one fourth of this wavelength is possible to reconstruct the whole wave. The largest wavelength Lmax that antenna with maximum length dmax will receive is thus $$L\text{max} = 4d\text{max} \qquad \text{Equation (5)}$$

At the same time, the Nyqvist theorem states that the minimum spatial wavelength Lmin correctly sampled by a linear array with minimum spacing between two different sensors equal to dmin is equal to 2dmin. Therefore, the range of wavelengths L spatially sampled in a correct way by an array with maximum length dmax and minimum spacing dmin is $$2d\text{min} = L\text{min} < L < L\text{max} = 4d\text{max} \qquad \text{Equation (6)}$$

The resolution R achieved by such an antenna is better than half the phase difference relative to maximum oscillation amplitude, which we have seen to correspond to one quarter of the wavelength. By virtue of equation (6) the spatial resolution achieved by the antenna can therefore conservatively set at $$R = \tfrac{1}{8} L\text{min} = \tfrac{1}{4} d\text{min} \qquad \text{Equation (7)}$$

It should be noted that, in general, geophone arrays allow one to record correctly a range of wavelengths wider than that defined by equation (6). This wider range is determined by the response curve of the individual sensors and by the time length of the measurement interval T. However, in this case the array will no more function as an antenna, i.e. the correlation of their simultaneous signals will not allow an improvement over the measure of the individual sensors.

Let us now see how we can exploit the interferometric theory of antennas in seismic surveying. Since according to Fourier transformation a wave is decomposed into its fundamental constituent frequencies, the maximum antenna efficiency is achieved when each of the frequencies present in the signal is sampled once and only once. In fact, only in this case all the necessary information is sampled and all the sampled information is used so that the sum of equation (2) directly provides the power spectrum.

Considering the case of a classic array for seismic survey, i.e. an array of 16 geophones equally spaced at a distance d, this one spatially samples 16 times the length d, 15 times the length 2d, 14 the length 3d, etc., and 1 time the length 16d. Attempting to use this array as a seismic antenna, that is reconstructing the wave as a sum of correlations between all pairs of sensors, yields a severely distorted picture.

To avoid distortion, the use of such a constant spaced array as an antenna requires to adopt appropriate filters to eliminate all redundant information. The use of standard constant spaced arrays as seismic antennas poses therefore the alternative between a serious distortion of the signal, with the formation of spurious signals (called aliases), and a major waste in information. In fact, filtering the signal is equivalent to throwing away information that was acquired at a cost.

It has been realized that including sensors whose recordings must then be discarded is illogical. Much more logical is to exclude these sensors directly from the antenna design, since an ideal seismic antenna must combine the correct spatial sampling with the minimum number of geophones in order to achieve maximum efficiency, ease and economy of use. It's defined that the ideal seismic antenna as the seismic array that covers the entire range of desired wavelengths [Lmin, Lmax] with a uniform spatial sampling of these wavelengths, using a minimum number of sensors.

Figure 2A:
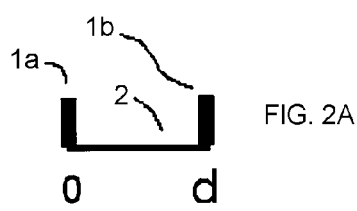
FIGS. 2A, 2B and 2C are graphical representations of sensors placements of the antenna for seismic survey with uniform spatial sampling in wavelength of the present invention.

Since in active seismic surveys the position of the wave source is known, and since in passive surveys there is a variety of sources nearly isotropically distributed, it is appropriate to consider a linear antenna, i.e. an in-line deployment of sensors. The most simple linear seismic antenna that allows uniform spatial wavelength sampling is a pair of stations placed at the points $x1=0$ and $x2=d$ (see FIG. 2A). According to equations (5), (6) and (7), this antenna effectively samples only nonzero wavelengths between $Lmin=2d$ and $Lmax=4d$, a range too restricted to reconstruct complex waveforms.

Figure 2B:
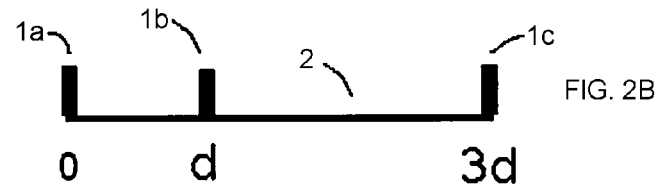

The immediately following linear seismic antenna that achieves wavelength uniform spatial sampling (see FIG. 2B) has a set of three sensors placed at points of coordinates $x1=0$, $x2=d$ and $x3=3d$; this one, through the pairs x1-x1, x1-x2, x2-x3 and x1-x3 can sample uniformly the spatial lengths 0, d, 2d and 3d. The representation allows to record uniformly wavelengths between $Lmin=2d$ and $Lmax=12d$ and is still relatively crude in the Fourier series to represent complex waveforms.

Figure 2C:
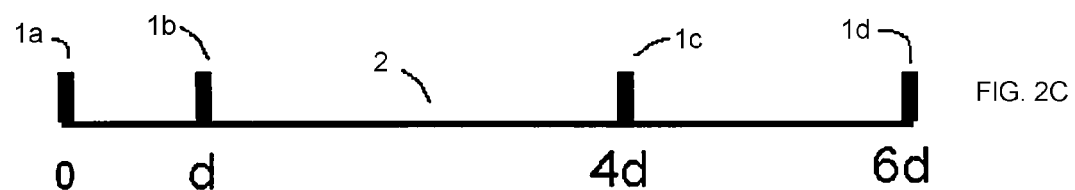

Far more interesting, and the subject of the present application, is the linear antenna with four sensors (see FIG. 2C) located at the points of coordinates $x1=0$, $x2=d$, $x3=4d$ and $x4=6d$ which, respectively through the sensor couples x1-x1, x1-x2, x3-x4, x2-x3, x1-x3, x2-x4 and x1-x4 samples uniformly the lengths 0, d, 2d, 3d, 4d, 5d and 6d. Since it has been seen that an antenna samples uniformly the wavelengths L from $Lmin=2d$ to $Lmax=24d$ with ¼d resolution, in terms of frequency and by virtue of equation (1), such antenna allows to sample uniformly frequencies from $f0=v/24d$ to $fmax=v/2d$ with resolution $\Delta f=v/(d/4)$.

The problem of uniform spatial coverage is a known problem in numerology and for which there is no solution for linear groups larger than 4 units. There is therefore no linear antenna with more than 4 elements that can achieve uniform wavelength coverage. Nor is there any solution on two-dimensional sets, which means that one cannot design any two-dimensional seismic antenna with uniform spatial wavelength coverage.

In a preferred embodiment (see FIG. 2), the sensors $1a$, $1b$, $1c$, $1d$ of the antenna are geophones sensitive to shear horizontal soil motion, and are thus appropriate to measure the velocity of Love surface waves. In a further embodiment, the geophones are sensitive to vertical soil motion, and are thus appropriate to measure the velocity of Rayleigh waves.

In a preferred embodiment, the study of the subsoil is limited to a maximum depth of 30 meters, as required by most seismic codes. For equations (5), (6) and (7), the total length of the linear 4 sensors antenna with uniform spatial sampling must be $Lmax=4dmax=30$ meters, so that $dmax=7.5$ meters, and $d=⅙dmax=1.25$ m, with a resolution of about 0.3 meters. This grants the antenna a very low cost together with a high accuracy and a great ease of handling.

In another preferred embodiment, the study of the subsurface is mainly aimed at maximum depths of about 10 meters, such as in seismic surveys of the first subsoil. The total length of the uniform linear antenna should therefore be about 2.5 meters, that is d would be of the order of 0.4 meters, resulting in a resolution of the order of 0.1 meters. This antenna provides extreme ease of handling and accuracy.

In a further preferred embodiment, the uniform linear antenna of appropriate length 6d is deployed on a structure and mechanically coupled to it through appropriate coupling means like screws, nails, glue or adhesives. The active or passive dynamic analysis of the vertical modes is effected by deploying the antenna vertically along the walls, while the active or passive dynamic analysis of the horizontal modes is effected by deploying the antenna horizontally on the structure surface. This allows an immediate undistorted picture of the structure vibrational modes at wavelengths from 2d to 24d.

By comparing the antenna dimensions with those of classical multi-channel seismic or vibration instrumentation, they result smaller by at least a factor of 4 in terms of the number of sensors and by at least a factor of 10 in terms of required extension. This stands for arrays at the same time much more accurate, cheaper, and easier to handle.

In a preferred embodiment the geophones are sequentially connected to a thin cable or ribbon, on which they are positioned at 0, d, 4d, 6d distances from one end (see FIG. 2C), and which may contain also the signal transmission wires. This realizes an immediate correct deployment of the seismic antenna.

While a preferred embodiment of the antenna for seismic survey with uniform spatial sampling in wavelength has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all

What is claimed as being new and desired to be protected by Letters Patent of the United States is as follows:

1. A seismic antenna for seismic survey with uniform spatial sampling in wavelength, said seismic antenna comprising:
   a plurality of vibration sensors each one having a sensitivity to be used simultaneously in sum of correlation for at least one seismic survey, said vibration sensors having a particular geometric layout that realizes uniform sampling in spatial wavelength;
   wherein said vibration sensors are at least 4 vibration sensors positioned along an alignment at distances from an origin, wherein a first vibration sensor is at said origin, a second vibration sensor is positioned a distance (d) from said first vibration sensor and is adjacent to said first vibration sensor, a third vibration sensor is positioned four times said distance from said first vibration sensor and is adjacent to said second vibration sensor, and a fourth vibration sensor is positioned six times said distance from said first vibration sensor and is adjacent to said third vibration sensor, where said distance is a value of distance to explore a desired wavelength interval, which results comprised between 2d and 24d.

2. The seismic antenna according to claim 1, wherein said seismic survey is at least one active seismic survey.

3. The seismic antenna according to claim 1, wherein said seismic survey is at least one passive seismic survey.

4. The seismic antenna according to claim 1, wherein said seismic survey is an active and a passive seismic survey.

5. The seismic antenna according to claim 1, wherein adjacent said vibration sensors are connected through a cable with a length between consecutive couples fixed to a prescribed values, in order to allow an immediate deployment without the need of any further measurement nor device.

6. The seismic antenna according to claim 5, wherein said cable is a ribbon.

7. The seismic antenna according to claim 5, wherein said value of distance d which is a parameter of at least one of a Vs30 parameter, a dynamic horizontal and vertical vibrational modes of a structure, elastic parameters of a foundation soil, and a parameter which is measurable through a spatial distribution of motion sensors.

8. The seismic antenna according to claim 7, wherein said vibration sensors are geophones sensitive to at least one of vertical motion, and horizontal motion.

9. The seismic antenna according to claim 7, wherein said geophones measure at least one of Love waves, and Rayleigh waves.

10. The seismic antenna according to claim 1, wherein said distance of said fourth vibration sensor from said first vibration sensor is a maximum of 30 meters.

11. The seismic antenna according to claim 1, wherein said uniform sampling is respectively through sensor couples of said first vibration sensor and said second vibration sensor, said third vibration sensor and said fourth vibration sensor, said second vibration sensor and said third vibration sensor, said first vibration sensor and said third vibration sensor, said second vibration sensor and said fourth vibration sensor, and said first vibration sensor and said fourth vibration sensor.

12. A method of conducting seismic survey with uniform spatial sampling in wavelength using a seismic antenna, said method comprising the steps of:
   a) providing a plurality of vibration sensors each one having a sensitivity to be used simultaneously in sum of correlation for at least one seismic survey;
   b) positioning said vibration sensors in a predetermined geometric layout that realizes uniform sampling in spatial wavelength, wherein said vibration sensors are at least 4 vibration sensors positioned along an alignment at distances from an origin, wherein a first vibration sensor is at said origin, a second vibration sensor is positioned a distance (d) from said first vibration sensor and is adjacent to said first vibration sensor, a third vibration sensor is positioned four times said distance from said first vibration sensor and is adjacent to said second vibration sensor, and a fourth vibration sensor is positioned six times said distance from said first vibration sensor and is adjacent to said third vibration sensor, where said distance is a value of distance to explore a desired wavelength interval, which results comprised between 2d and 24d;
   c) measuring motion using said vibration sensors; and
   d) correlating simultaneously signals from said vibration sensors.

13. The method according to claim 12 further comprising, after said step of locating said vibration sensors along an alignment, the step of connecting adjacent said vibration sensors are through a cable with a length between consecutive couples fixed to prescribed values, allowing for an immediate deployment without the need of any further measurement nor device.

14. The method according to claim 13, wherein said value of distance d which is a parameter of at least one of a Vs30 parameter, a dynamic horizontal and vertical vibrational modes of a structure, elastic parameters of a foundation soil, and a parameter which is measurable through a spatial distribution of motion sensors.

15. The method according to claim 12, wherein said distance of said fourth vibration sensor from said first vibration sensor is a maximum of 30 meters.

16. The method according to claim 12, wherein said uniform sampling is respectively through sensor couples of said first vibration sensor and said second vibration sensor, said third vibration sensor and said fourth vibration sensor, said second vibration sensor and said third vibration sensor, said first vibration sensor and said third vibration sensor, said second vibration sensor and said fourth vibration sensor, and said first vibration sensor and said fourth vibration sensor.

* * * * *